(12) United States Patent
Yoon et al.

(10) Patent No.: US 7,611,798 B2
(45) Date of Patent: Nov. 3, 2009

(54) BUS BAR FOR ELECTRIC CONNECTION AND MIDDLE AND BATTERY MODULE COMPRISING THE SAME

(75) Inventors: Junill Yoon, Seoul (KR); Juyoung Kim, Daejeon (KR)

(73) Assignee: LG Chem, Ltd. (KR)

( * ) Notice: Subject to any disclaimer, the term of this patent is extended or adjusted under 35 U.S.C. 154(b) by 188 days.

(21) Appl. No.: 11/550,088

(22) Filed: Oct. 17, 2006

(65) Prior Publication Data
US 2008/0199765 A1   Aug. 21, 2008

(30) Foreign Application Priority Data
Oct. 21, 2005   (KR) .................. 10-2005-0099851

(51) Int. Cl.
*H01M 10/48* (2006.01)
*H01M 6/42* (2006.01)
*H01B 5/02* (2006.01)
*H02B 1/20* (2006.01)

(52) U.S. Cl. .............. 429/91; 429/90; 429/92; 429/93; 429/152; 429/153; 429/154; 429/160; 174/133 B; 361/624; 361/637; 361/638; 361/639

(58) Field of Classification Search ............ None
See application file for complete search history.

(56) References Cited

U.S. PATENT DOCUMENTS

| | | | | |
|---|---|---|---|---|
| 4,155,829 A | * | 5/1979 | Ralston, Jr. | 204/225 |
| 5,017,859 A | * | 5/1991 | Engel et al. | 324/127 |
| 5,153,449 A | * | 10/1992 | Crook et al. | 307/66 |
| 5,162,164 A | * | 11/1992 | Dougherty et al. | 429/9 |
| 6,146,788 A | * | 11/2000 | Ikeda et al. | 429/160 |
| 6,319,631 B1 | * | 11/2001 | Bay et al. | 429/178 |
| 6,541,154 B2 | * | 4/2003 | Oogami et al. | 429/159 |
| 6,677,759 B2 | * | 1/2004 | Friel et al. | 324/430 |

FOREIGN PATENT DOCUMENTS

| KR | 10-2006-0072922 | 6/2006 |
|---|---|---|
| KR | 10-2006-0090469 | 8/2006 |
| KR | 10-2006-0110407 | 10/2006 |

OTHER PUBLICATIONS

Linden, D.; Reddy, T.B. (2002). Handbook of Batteries (3rd Edition). McGraw-Hill. Online version available at: http://knovel.com/web/portal/browse/display?_EXT_KNOVEL_DISPLAY_bookid=627& VerticalID=0.*

* cited by examiner

*Primary Examiner*—Dah-Wei D Yuan
*Assistant Examiner*—Katherine Turner
(74) *Attorney, Agent, or Firm*—Cantor Colburn LLP

(57) ABSTRACT

A bus bar simultaneously performs electrical connection between unit cells and detection of voltage of the unit cells in a battery module having the same and includes: vertical bent parts formed by bending opposite ends of a strip-shaped bar body in the same direction, the vertical bent parts being provided with coupling grooves or protrusions; and a horizontal bent part formed by bending one of the vertical bent parts toward the bar body such that the horizontal bent part is parallel with the bar body. The electrode terminals of the unit cells are connected to the rear surface of the bar body of the bus bar, whereby the electrical connection between the unit cells is accomplished, and the horizontal bent part of the bus bar is directly connected to a battery management system for monitoring the potential difference and the temperature of the unit cells to control the unit cells.

16 Claims, 6 Drawing Sheets

BUS BAR FOR ELECTRIC CONNECTION AND MIDDLE AND BATTERY MODULE COMPRISING THE SAME

FIELD OF THE INVENTION

The present invention relates to a novel bus bar for electrical connection and a medium- or large-sized battery module including the same, and, more particularly, to a bus bar that simultaneously performs the electrical connection between a plurality of unit cells and the detection of voltage of the unit cells in a battery module having the unit cells mounted therein, wherein the bus bar includes vertical bent parts formed by bending opposite ends of a strip-shaped bar body in the same direction, respectively, the vertical bent parts being provided with coupling grooves or protrusions, and a horizontal bent part formed by bending one of the vertical bent parts such that the horizontal bent part is parallel with the bar body, and a battery module including a plurality of unit cells, wherein the electrical connection between the unit cells and the detection of voltage of the unit cells are simultaneously performed using the bus bar.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized unit cells for each device. On the other hand, medium- or large-sized devices, such as vehicles, use a medium- or large-sized battery pack having a plurality of unit cells electrically connected with each other because high output and large capacity are necessary for the medium- or large-sized devices.

As the unit cell for the medium- or large-sized battery pack is widely used a pouch-shaped secondary battery, which is generally packaged in a battery case made of a laminate sheet generally consisting of aluminum and polymer resin, and therefore, the mechanical strength of the pouch-shaped secondary battery is not high. For this reason, a plurality of unit cells are mounted in a battery cartridge, where the unit cells are connected in series and/or in parallel with each other, and a plurality of battery cartridges are electrically connected with each other to constitute a battery module.

A battery module widely used for hybrid electric vehicles has a closed-type structure in which an electrolyte cannot leak from each unit cell (secondary cell). Consequently, the closed-type battery module has an advantage of preventing leakage of the electrolyte. However, the closed-type battery module has problems in that heat generated in the unit cells is accumulated, and therefore, the accumulated heat accelerates the deterioration of the unit cells and that some of the unit cells are overheated when they are operated abnormally, and therefore, the unit cells may catch fire or explode. Lithium-ion secondary batteries or lithium-ion polymer secondary batteries, which are currently generating much interest in the potential uses of unit cells, generate heat while the secondary batteries are charged and discharged. When such heat is continuously accumulated in the unit cells, the deterioration of the unit cells is accelerated, and furthermore, the unit cells may catch fire or explode.

A battery cartridge having a novel structure to solve the above-mentioned problems and a battery module including the same have been developed by the applicant of the present application and filed with the Korean Intellectual Property Office (Korean Patent Application No. 2004-111699).

The battery cartridge and the battery module described in the above-mentioned patent application are characterized in that unit cells having low mechanical strength are stably mounted, heat dissipation from the unit cells is effectively accomplished, the overheat generated when the unit cells are operated abnormally is removed, and therefore, the service life and the safety of the unit cells are improved. Also, the battery module is manufactured in a compact structure, and therefore, it is possible to provide a small-sized but high-output, large-capacity battery module or battery pack.

On the other hand, the electrical connection between the unit cells and the coupling between the unit cells and the other components are performed in a small area so as to manufacture a compact battery module or a compact battery pack. As a result, a possibility of short circuits exists, and it is not possible to perform welding or mechanical coupling using bolts and nuts. In consideration of such difficulties, some of conventional arts proposed methods of accomplishing the electrical connection between the unit cells in a contact fashion using elastic members, such as springs. However, these conventional methods have several problems in that the mechanical strength or the resistance to vibrations is low, contact resistance is increased due to corrosion, and connected parts are easily separated from each other.

Also, the medium- or large-sized battery module or battery pack includes a plurality of unit cells, and the operating performance of the system is deteriorated due to overheating of some unit cells and high potential difference between the unit cells. For this reason, it is necessary to provide a battery management system (BMS) for monitoring and controlling the overheating of the unit cells and the potential difference between the unit cells. Consequently, an additional connecting member for connecting the unit cells and the BMS is needed. However, the use of a large amount of components in a compact battery module or battery pack may cause the above-described problems.

SUMMARY OF THE INVENTION

Therefore, the present invention has been made to solve the above problems, and other technical problems that have yet to be resolved.

Specifically, it is a first object of the present invention to provide a bus bar for electrical connection that is capable of easily accomplishing electrical connection and mechanical coupling in a medium- or large-sized battery module or battery pack and that has excellent electrical characteristics, such as electrical resistance at connected regions after the electrical connection, and excellent mechanical strength against external impacts or vibrations.

The bus bar prevents occurrence of short circuits, which may be caused by a user or an operator, during a manufacturing process of the battery module or the battery pack or during a maintenance process of the battery module or the battery pack. Furthermore, the size of the battery pack is further decreased through the use of the bus bar.

It is a second object of the present invention to provide a battery module wherein the electrical connection between unit cells is accomplished using the bus bar and the unit cells are directly connected to a battery management system (BMS) for detecting voltage and/or temperature of the unit cells using the bus bar, whereby the use of additional connecting members is not necessary, and therefore, the battery module is manufactured in a compact structure, the electrical connection between the unit cells is stable, and the durability, including the mechanical characteristics, of the battery module is excellent.

In accordance with one aspect of the present invention, the above and other objects can be accomplished by the provision of a bus bar that simultaneously performs the electrical connection between a plurality of unit cells and the detection of voltage of the unit cells in a battery module having the unit cells mounted therein, wherein the bus bar comprises: vertical bent parts formed by bending opposite ends of a strip-shaped bar body in the same direction, respectively, the vertical bent parts being provided with coupling grooves or coupling protrusions; and a horizontal bent part formed by bending one of the vertical bent parts such that the horizontal bent part is parallel with the bar body.

The bus bar according to the present invention is characterized in that the electrical connection between the unit cells and the detection of the voltage of the unit cells can be performed simultaneously by using the bus bar. Conventional bus bars are mainly used to perform the electrical connection between the unit cells. The detection of the voltage of the unit cells is performed using an additional connecting member (e.g., a wire, a bus bar, and a coupling member).

An example of a bus bar performing the electrical connection and the voltage detection is described in Korean Patent Application No. 2005-11380, which has been filed in the name of the applicant of the present application. The bus bar includes a plate-shaped bar body, which is in surface contact with electrode terminals of unit cells, a coupling part formed by partially bending opposite ends of the bar body, and an electrical connection part formed by partially bending the opposite ends of the bar body. In the coupling part is formed a coupling groove, in which a coupling protrusion of a base plate is engaged. The electrical connection part is constructed in the form of a protrusion, and therefore, the electrical connection part is mounted in the corresponding region of a printed circuit board (PCB).

However, the voltage detection using the bus bar is accomplished in a structure in which the bus bar is connected to an additional PCB through the protruding connection part while the bus bar is mounted to the base plate, the PCB is connected to a battery management system (BMS) attached to a battery module. As a result, the additional PCB connected to the BMS is essentially needed, and therefore, the structure of the battery module is somewhat complicated. This structure in which the unit cells are connected to the BMS through such an additional connecting member (e.g., a PCB, a wire, and a bus bar) is adopted in a large majority of battery modules as well as the battery module of the above-mentioned patent application.

On the other hand, the bus bar according to the present invention can be directly connected to the BMS without using an additional connecting member, and therefore, it is possible to manufacture a battery module having a compact and stable structure. Furthermore, the assembly process is simplified, and therefore, the manufacturing costs of the battery module are reduced. However, a major portion of the battery module according to the present invention is based on the construction described in the above-mentioned patent application, i.e., Korean Patent Application No. 2005-11380, and therefore, the description of this patent application is incorporated herein by reference.

The bus bar according to the present invention is mounted to a base plate such that the bus bar can be connected to electrode terminals of the unit cells, and the base plate is a rectangular member including a plurality of openings, in which a plurality of bus bars are mounted, respectively, the openings being provided with coupling protrusions or coupling grooves corresponding to the coupling grooves or the coupling protrusions formed at the vertical bent parts of the bus bars.

The electrode terminals of the unit cells are connected to the rear surface of the bar body of the bus bar, whereby the electrical connection between the unit cells is accomplished. For example, a cathode terminal of one of two unit cells (a, b), i.e., the unit cell (a), and an anode terminal of the other unit cell (b) are connected to the bar body of a bus bar, whereby the two cells are connected in series with each other, which will be described below in detail.

The electrical connection between the unit cells is accomplished by the bar body of the bus bar, and, at the same time, the voltage of the unit cells is detected through the horizontal bent part of the bus bar. At this time, the horizontal bent part of the bus bar may be directed to the BMS without an additional bus bar. For example, the BMS is brought into contact with the base plate, to which a plurality of bus bars electrically connecting the electrode terminals of the unit cells are mounted in a predetermined array, and therefore, the horizontal bent part of the bus bar is directly connected to the corresponding circuit part of the BMS for voltage detection. Consequently, no additional connecting member for connecting the electrode terminals of the unit cells and the BMS is needed.

In a preferred embodiment of the present invention, the BMS is constructed in the form of a PCB, and the horizontal bent part of the bus bar is provided with a coupling groove or a coupling protrusion, by which the electrical connection and the mechanical coupling between the horizontal bent part and the BMS is accomplished. Preferably, the horizontal bent part is provided with a coupling groove having a thread formed therein, the BMS board is provided with holes extending through a circuit of the BMS board, and the bus bar and the BMS board are coupled with each other using a conductive screw while the bus bar and the BMS board are arranged such that the coupling groove communicates with one of the holes.

The bus bar according to the present invention is not particularly restricted so long as the bus bar is made of a conductive material. Preferably, the bus bar is made of metal.

In accordance with another aspect of the present invention, there is provided a battery module including a plurality of unit cells, wherein the electrical connection between the unit cells and the detection of voltage of the unit cells are simultaneously performed using the above-described bus bar.

Various kinds of secondary batteries may be used as the unit cells. Preferably, plate-shaped batteries, which can be stacked with high integration, are used as the unit cells. More preferably, pouch-shaped batteries, which can be manufactured with small manufacturing costs and are light in weight, are used as the unit cells.

Preferably, the unit cells, especially, the pouch-shaped batteries, which have low mechanical strength, are included in the battery module while the unit cells are mounted in battery cartridges constructed in a frame structure. The battery cartridges may be constructed in various structures. As a preferred example, each of the battery cartridges includes a pair of outer frame members (a, b) and an inner frame member (c) disposed between the outer frame members (a, b), and a unit cell is mounted between the first outer frame member (a) and the inner frame member (c), and another unit cell is mounted between the second outer frame member (b) and the inner frame member (c). According to circumstances, two or more unit cells are mounted between the first outer frame member (a) and the inner frame member (c), and two or more unit cells are also mounted between the second outer frame member (b) and the inner frame member (c).

While the two unit cells are mounted in each of the battery cartridges, the electrode terminals of each unit cell protrude toward the upper ends of the frame members (a, b, c). In a preferred embodiment of the present invention, the inner frame member (c) is provided at a predetermined position corresponding to one of the electrode terminals (the cathode terminal or the anode terminal) of the upper end thereof with a skirt, which extends along the corresponding electrode terminal, and the base plate is provided at a predetermined position corresponding to the skirt with a groove, in which the skirt is engaged. This structure of the skirt and the groove prevents occurrence of electrical short circuits, which may be caused by incorrect connection of the cathode and the anode when the base plate, to which the bus bars are mounted, is assembled with the battery cartridges, as will be described below in detail, and accurately sets the coupling positions of the base plate and the battery cartridges.

The electrode terminals of the unit cells mounted in the battery cartridges and the bus bars mounted to the base plate are securely attached to each other, preferably, by welding or soldering after the assembly of the battery cartridges and the base plate is completed, whereby the coupling and the electrical connection between the electrode terminals and the bus bars are more securely accomplished. More preferably, the electrode terminals of the unit cells and the bus bars are securely attached to each other by welding, such as laser welding or resistance welding.

Preferably, the outer frame members (a, b) are provided at the upper ends thereof with locating parts, at which the electrode terminals of the unit cells are located while being bent, and the outer frame members are provided under the locating parts thereof with depressions, which extend in the lateral direction of the unit cells, the locating parts having pluralities of welding grooves, which extend in the longitudinal direction of the outer frame members such that the welding grooves can communicate with the depressions, whereby the welding operation is easily carried out. Consequently, when a welding operation, for example, a resistance welding operation (or a spot welding operation) is carried out while the plurality of battery cartridges are stacked, one welding tip is connected to the lower ends of the electrode terminals on the locating parts through the depressions and the welding grooves, and another welding tip is connected to the upper ends of the bus bars. It has been proved that the welding grooves are helpful even when a laser welding operation is carried out at the upper ends of the bus bars.

In a preferred embodiment of the present invention, each of the battery cartridges further has a thermistor for measuring the temperature of the unit cells. The thermistor may be mounted between the unit cells through a groove formed between the anode terminal locating part and the cathode terminal locating part of the inner frame member (c).

The coupling between the frame members is not particularly restricted. For example, the coupling between the frame members may be accomplished by various coupling methods, such as bolts/nuts, rivets, welding, adhesive, a male and female screw coupling member or structure.

Also, the material for the frame members is not particularly restricted. The frame members may be made of various materials, such as plastic resin or metal. In the case of using a conductive material, such as metal, however, it is necessary to electrically insulate the exposed parts of electrode leads.

When the bus bars are mounted in the openings of the base plate, the strip-shaped bus bars can be elastically engaged in the openings of the base plate, and the strip-shaped bus bars can be securely fixed to the base plate by the engagement of the coupling protrusions in the corresponding coupling grooves.

For example, the base plate is attached to the upper ends of the plurality of battery cartridges, which are stacked, i.e., to the electrode terminals of the unit cells. The base plate includes openings (an upper opening array), in which bus bars interconnecting one-side electrode terminals of the stacked battery cartridges are mounted, and openings (a lower opening array), in which bus bars interconnecting the other-side electrode terminals of the stacked battery cartridges are mounted. The openings of the upper opening array and the openings of the lower opening array are alternately arranged, which will be described hereinafter in detail. As previously described, one of the two opening arrays may be provided with grooves, in which the skirts of the battery cartridges are engaged, and the other opening array may be provided with corresponding skirts.

Preferably, a battery management system (BMS) for monitoring the potential difference and the temperature of the unit cells to control the unit cells is mounted to one surface of the base plate (opposite to the surface with which the upper end parts of the battery cartridges are in contact) in a direct contact fashion. The BMS includes terminals, which contact the horizontal bent parts of the bus bars. The BMS further includes a circuit for preventing overcharge, overdischarge, and overcurrent of the unit cells. Preferably, the BMS is constructed in the form of a printed circuit board (PCB). Generally, the PCB is constructed in a structure in which a predetermined circuit is printed on a plate-shaped member made of a denatured epoxy resin compound. In the case that a thermistor is mounted to each of the battery cartridges, connectors, which can be connected to the thermistors, are formed at the BMS.

In a preferred embodiment of the present invention, the medium- or large-sized battery module comprises: a cartridge assembly including two or more battery cartridges; and a box-shaped case having an open front part, through which the cartridge assembly is inserted, and an inner space, in which the cartridge assembly is mounted.

The battery module according to the present invention is generally compact, and the structural stability of the battery module is excellent. The battery module may be constructed in an open type structure in which heat generated from unit cells, while the unit cells are charge and discharged, is effectively removed even though the battery module has the compact structure. The details of the battery module constructed in the open type structure are described in Korean Patent Application No. 2004-111699, which has been filed in the name of the applicant of the present application. The description of the above-mentioned patent application is hereby incorporated by reference.

The plurality of battery cartridges are inserted into the module case, the base plate and the BMS are coupled to the open front part of the module case, whereby the battery module is manufactured.

According to circumstances, the outer surface of the BMS may be covered by a safety plate.

In accordance with yet another aspect of the present invention, there is provided a medium- or large-sized battery pack having high output and large capacity which comprises a plurality of battery modules electrically connected with each other. Preferably, a coupling member for accomplishing effective coupling between the battery modules may be further included.

The battery pack according to the present invention may be used for high-output, large-capacity battery packs. Preferably, the battery pack is used for battery packs of electric vehicles or hybrid electric vehicles. More preferably, the battery pack is used for battery packs of hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

| | |
|---|---|
| 100: | battery cartridge |
| 200: | unit cell |
| 300: | bus bar |
| 400: | base plate |
| 500: | BMS |
| 600: | module case |
| 700: | battery module |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
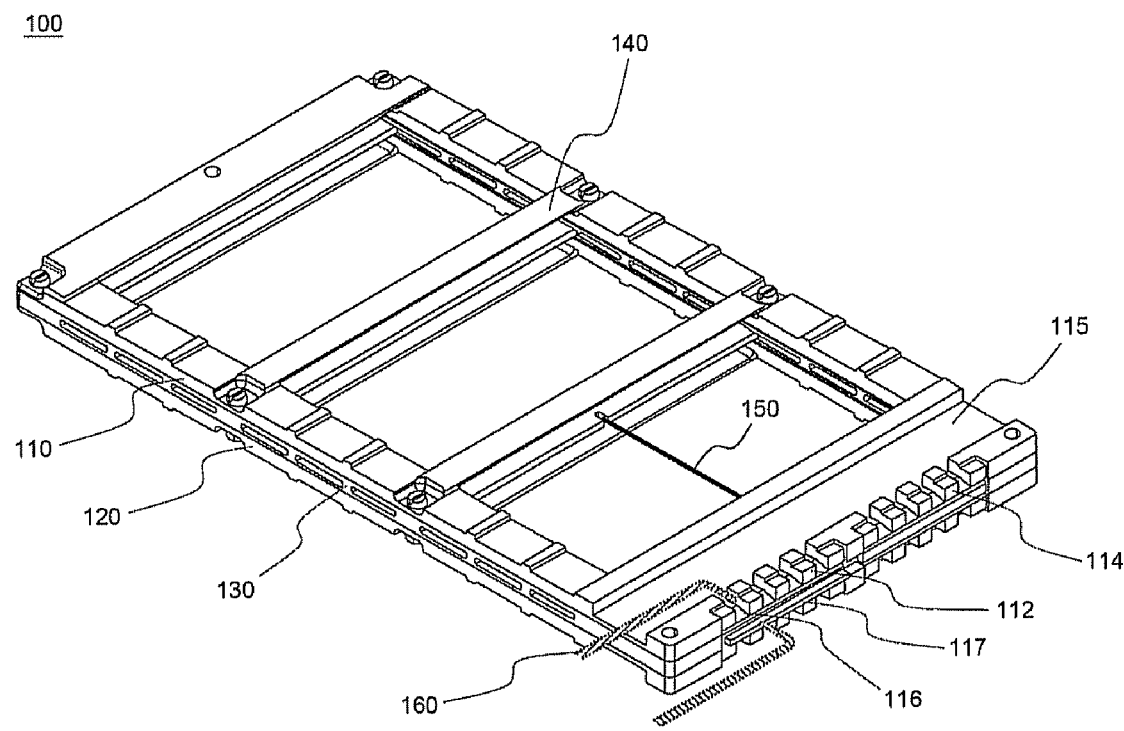
FIG. 1 is a perspective view illustrating a battery cartridge according a preferred embodiment, which can be used in the present invention.

FIG. 1 is a perspective view typically illustrating a battery cartridge according a preferred embodiment of the present invention.

Referring to FIG. 1, the battery cartridge 100 includes a pair of outer frame members 110 and 120, and an inner frame member 130 disposed between the outer frame members 110 and 120. The details of the frame members 110, 120, and 130 are described in Korean Patent Application No. 2004-111699, which has been filed in the name of the applicant of the present application.

Two unit cells (not shown) are mounted in a hollow part between the first outer frame member 110 and the inner frame member 130 and in another hollow part between the second outer frame member 120 and the inner frame member 130, respectively. The frame members 110, 120, and 130 include pluralities of supporting bars 140, which traverse the hollow parts of the frame members 110, 120, and 130 in the lateral direction of the frame members 110, 120, and 130 for supporting the unit cells mounted between the first outer frame member 110 and the inner frame member 130 and between the second outer frame member 120 and the inner frame member 130.

At the inner frame member 130 is mounted a thermistor 150 for measuring the temperature of the unit cells. The structure of the inner frame member 130 will be described in more detail with reference to FIG. 2.

Referring back to FIG. 1, the outer frame members 110 and 120 are provided at the upper ends thereof with locating parts 112 and 114, respectively, at which electrode terminals of the unit cells, which are mounted between the first outer frame member 110 and the inner frame member 130 and between the second outer frame member 120 and the inner frame member 130, are located while being bent. At the outer frame members 110 and 120 under the locating parts 112 and 114 are formed depressions 115, which extend in the lateral direction of the unit cells. At the locating parts 112 and 114 are also formed pluralities of welding grooves 116, which communicate with the depressions 115. Consequently, when a welding operation, for example, a resistance welding operation is carried out to bus bars (not shown) and electrode terminals (not shown) on the locating parts 112 and 114 during the assembly, one welding tip 160 can be connected to the lower ends of the electrode terminals through the depressions 115 and the welding grooves 116.

Figure 2:
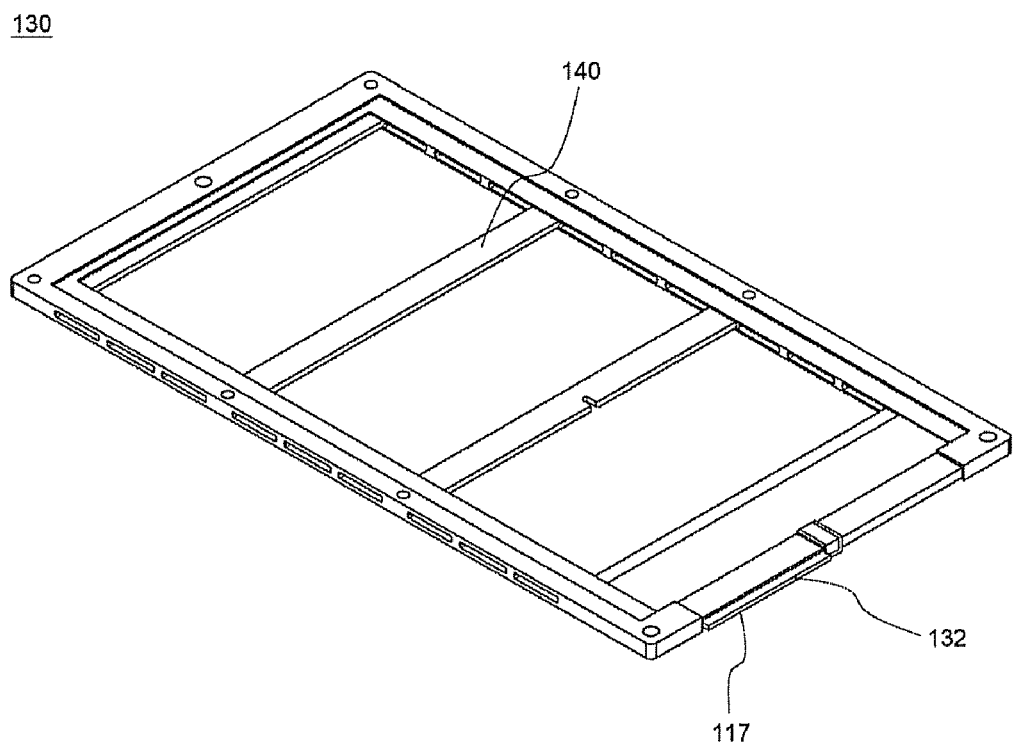
FIG. 2 is a perspective view illustrating an inner frame member used in the battery cartridge of FIG. 1.

A skirt 117 protrudes from one of the locating parts 112 and 114 formed at the upper end of the battery cartridge 100, i.e., the locating part 112. More specifically, as shown in FIG. 2, the skirt 117 protrudes from one side of a locating part 132 formed at the upper end of the inner frame member 130 such that the skirt 117 extends in the lateral direction of the inner frame member 130, which will be described below in detail with reference to FIG. 3.

Figure 3:
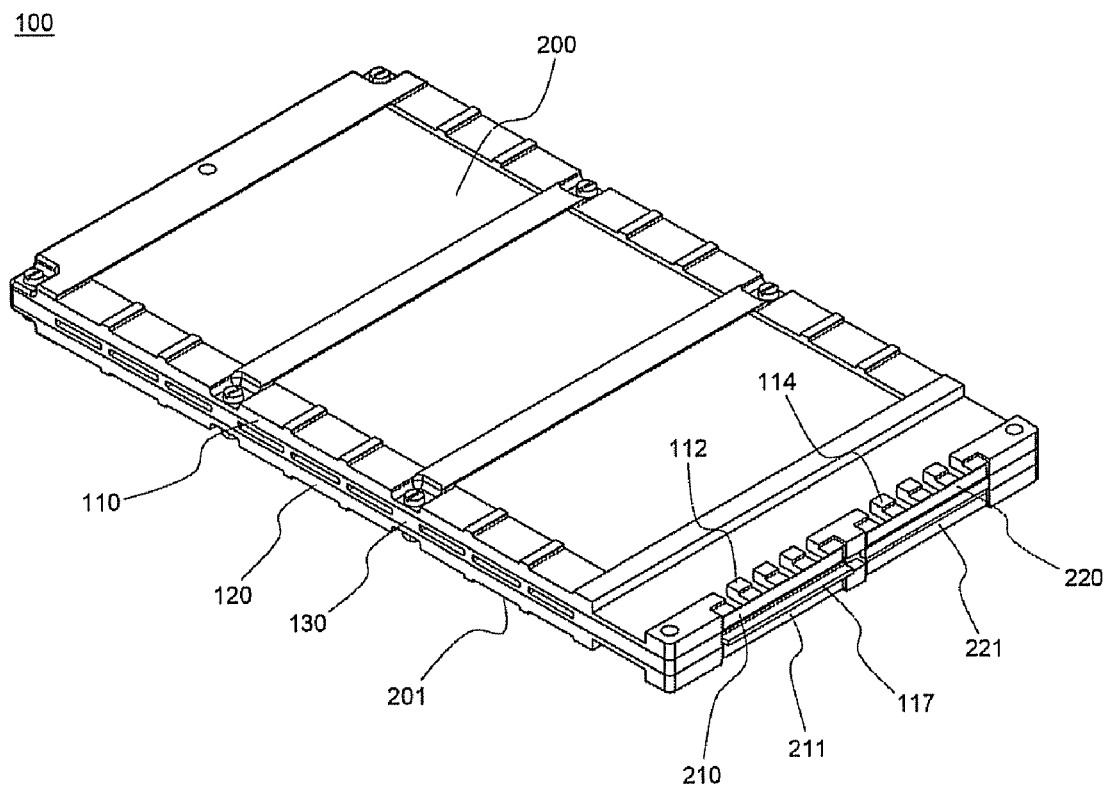
FIG. 3 is a perspective view illustrating two unit cells mounted in a battery cartridge.

FIG. 3 is a perspective view typically illustrating unit cells mounted in the battery cartridge of FIG. 1.

Referring to FIG. 3, electrode terminals 210 and 220 of a unit cell 200, which is mounted between the first outer frame member 110 and the inner frame member 130, and electrode terminals 211 and 221 of another unit cell 201, which is mounted between the second outer frame member 120 and the inner frame member 130 are located at the locating parts 112 and 114, which are formed at the upper end of the battery cartridge, while being bent. Specifically, the electrode terminals 210 and 220 are bent upward while the electrode terminals 221 and 221 are bent downward, as shown in the drawing.

For example, on the assumption that the electrode terminal 210 of the unit cell 200 is a cathode terminal, and the electrode terminal 220 of the unit cell 200 is an anode terminal, the electrode terminal 211 of the unit cell 201 is an anode terminal, and the electrode terminal 221 of the unit cell 201 is a cathode terminal. Consequently, when the two unit cells 200 and 201 are connected in series with each other, the anode terminal 220 of the unit cell 200 and the cathode terminal 221 of the unit cell 201 are electrically connected with each other via a bus bar (not shown), the cathode terminal 210 of the unit cell 200 is connected to a cathode terminal of a unit cell A of a neighboring battery cartridge (not shown), and the anode terminal 211 of the unit cell 201 is connected to a cathode terminal of a unit cell B of another neighboring battery cartridge (not shown).

Consequently, the electrode terminals 220 and 221, which are located at one of the locating parts 112 and 114 of the battery cartridge 100, i.e., the locating part 114, while being bent, are directly connected with each other. On the other hand, the electrode terminals 210 and 211, which are located at the other locating part 112 of the battery cartridge 100 while being bent, are not directly connected with each other but are connected to the corresponding electrode terminals of the neighboring battery cartridges. At this time, the skirt 117 disposed on the locating part 112 prevents the electrode terminals 210 and 211, which are bent in opposite directions at the opposite sides of the skirt 117, from being directly connected with each other by the bus bar, whereby the occurrence of short circuits due to the incorrect assembly is prevented.

Figure 4:
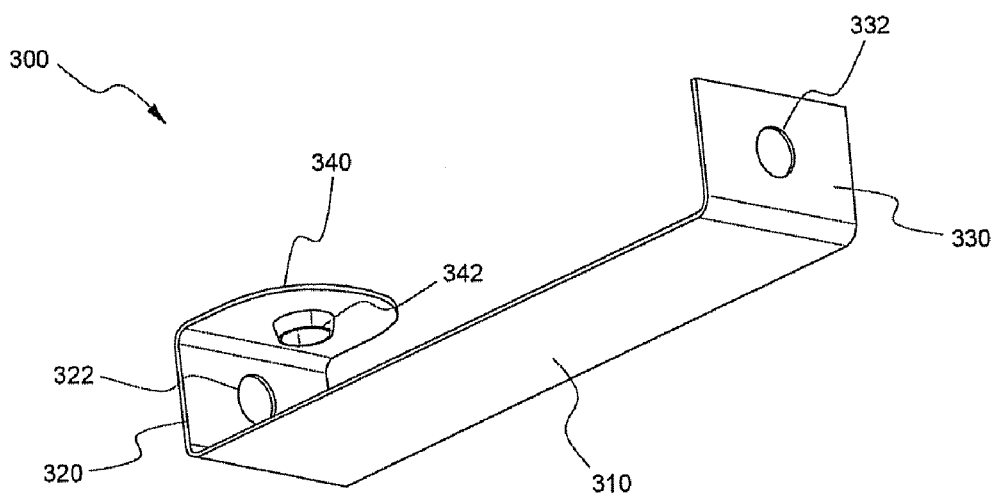
FIG. 4 is a perspective view illustrating a bus bar according to a preferred embodiment, which can be used in the present invention.

FIG. 4 is a perspective view typically illustrating a bus bar according to a preferred embodiment, which can be used in the present invention.

Referring to FIG. 4, the bus bar 300 includes a strip-shaped bar body 310 for electrically connecting unit cells (not shown), vertical bent parts 320 and 330 formed by bending opposite ends of the bar body 310 upward, respectively, such that the vertical bent parts 320 and 330 are perpendicular to the bar body 310, and a horizontal bent part 340 formed by bending one of the vertical bent parts 320 and 330 such that the horizontal bent part 340 is parallel with the bar body 310.

At the vertical bent parts 320 and 330 are formed coupling grooves 322 and 332, in which coupling protrusions 420 (see FIG. 5) formed in opening of a base plate are engaged.

As shown in the drawing, the horizontal bent part 340 is bent from the vertical bent part 320 toward the vertical bent part 330. According to circumstances, however, the horizontal bent part 340 may be bent at an arbitrary angle to the vertical bent part 320. For example, the horizontal bent part 340 may be bent from the vertical bent part 320 in the opposite direction to the vertical bent part 330.

In the horizontal bent part 340 is formed a coupling groove 342 having a thread formed therein for easily accomplishing the electrical connection and the mechanical coupling between the horizontal bent part 340 and a battery management system (BMS), which is not shown.

Figure 5:
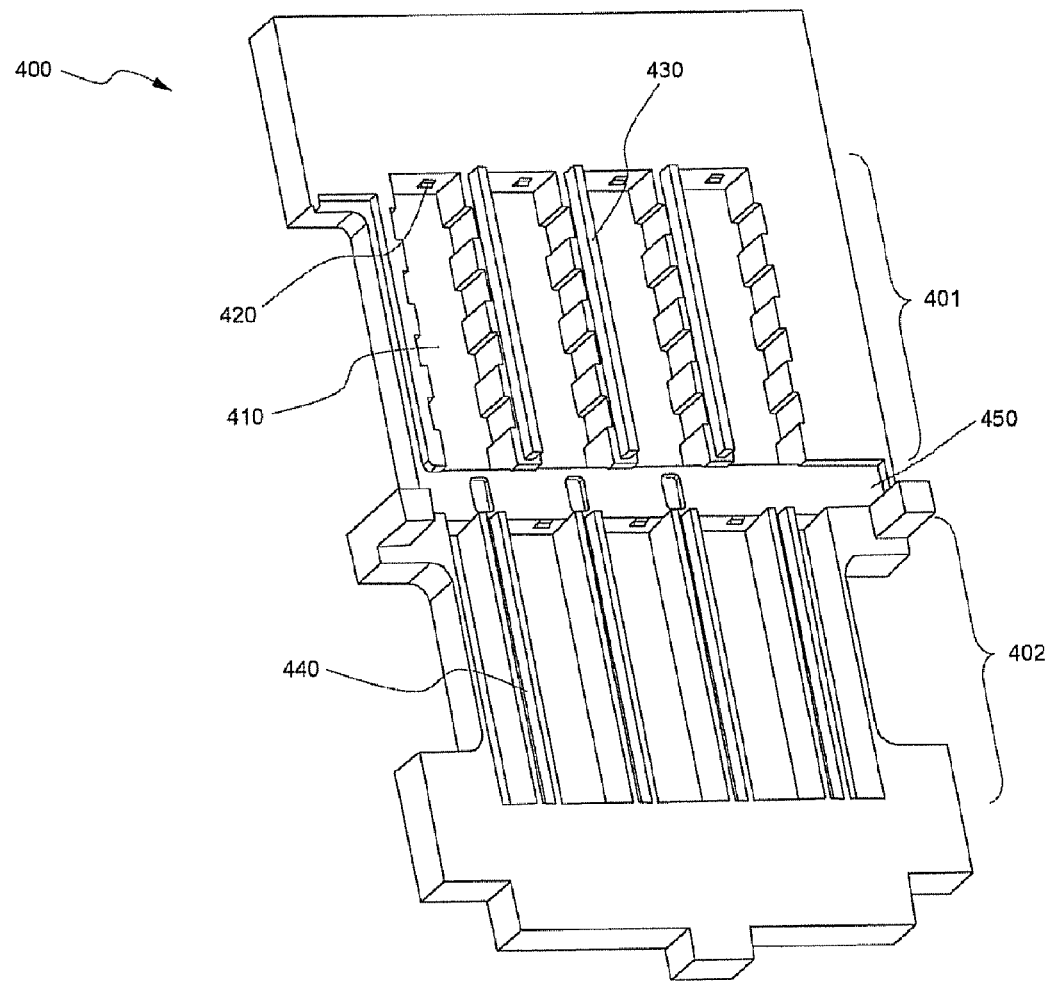
FIG. 5 is a perspective view illustrating a base plate according to a preferred embodiment, which can be used in the present invention.

FIG. 5 is a perspective view typically illustrating a base plate according to a preferred embodiment, which can be used in the present invention.

Referring to FIG. 5, the base plate 400 is a thick plate-shaped member including a plurality of openings 410, in which bus bars (not shown) are mounted, respectively. The openings 410 are rectangular through-holes having a size corresponding to the bus bars. At the opposite ends of the inside surface of each opening 410 are formed coupling members 420, which are engaged in the coupling grooves 322 and 332 of the bus bar (see FIG. 4).

The openings 410 of the base plate 400 are classified into an upper opening array 401, in which bus bars interconnecting one-side electrode terminals of stacked battery cartridges are mounted, and a lower opening array 402, in which bus bars interconnecting the other-side electrode terminals of the stacked battery cartridges are mounted. The openings of the upper opening array 401 and the openings of the lower opening array 402 are alternately arranged because of the connecting positions of the bus bars when the electrode terminals are electrically connected with each other, as previously described with reference to FIG. 3. Also, skirts 430 are formed on the partitions between the openings of the upper opening array 401, and grooves 440 are formed on the partitions between the openings of the lower opening array 402. The skirt 117 disposed on the locating part 112 formed at the upper end of the battery cartridge 100 (see FIG. 3) is engaged in the corresponding groove 440 of the lower opening array 402. Between the upper opening array 401 and the lower opening array 402 is disposed a bridge 450. On the bridge 450 are formed a plurality of grooves, in which connectors of thermistors (not shown) are located.

Figure 6:
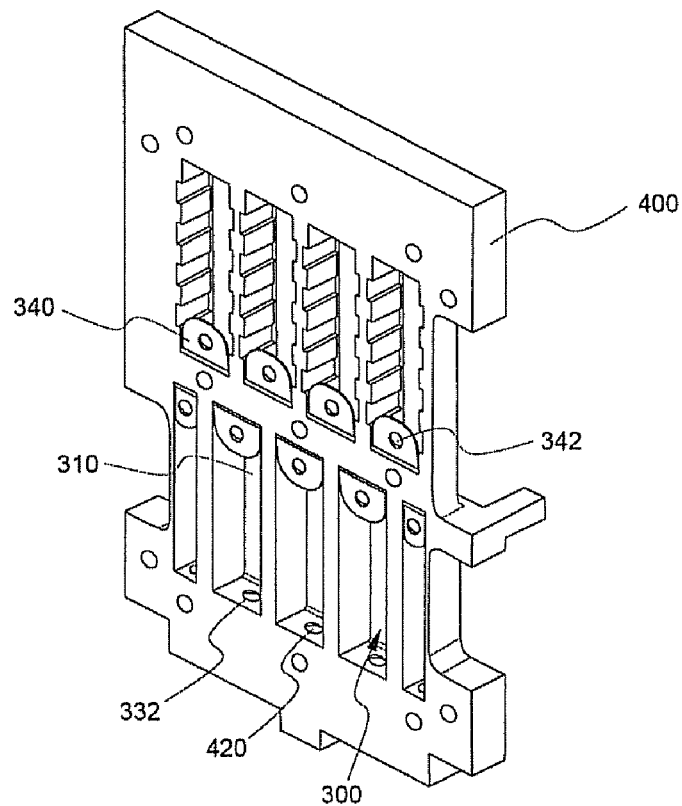
FIG. 6 is a front perspective view illustrating the bus bars of FIG. 4 mounted to the base plate of FIG. 5.

FIG. 6 is a front perspective view illustrating the bus bars of FIG. 4 mounted to the base plate of FIG. 5.

Referring to FIG. 6, the coupling protrusions 420 of the base plate 400 are engaged into the coupling grooves 332 of the bus bars 300, whereby the bus bars 300 are mounted to the base plate 400. In the state that the bus bars 300 are mounted to the base plate 400, the horizontal bent parts 340 of the bus bars 300 are exposed from the front surface (or the outer surface) of the base plate 400 through the openings 410, and the bar bodies 310 of the bus bars 300 are exposed from the rear surface (or the inner surface) of the base plate 400. The electrode terminals of the battery cartridges 100 (see FIG. 3) are connected to the rear surfaces of the bar bodies 310 of the bus bars 300. It is preferable that the electrode terminals of the battery cartridges 100 are securely attached to the bar bodies 310 of the bus bars 300 by laser welding or resistance welding. Because of the elastic engagement between the coupling protrusions 420 of the base plate 400 and the coupling grooves 322 of the bus bars 300, the bar bodies 310 of the bus bars 300 are connected to the electrode terminals of the battery cartridges in a somewhat pressurized state when the base plate 400 is coupled to a battery module (not shown) having a plurality of battery cartridges mounted therein, whereby conditions preferable to perform the welding or the soldering are formed.

Figure 7:
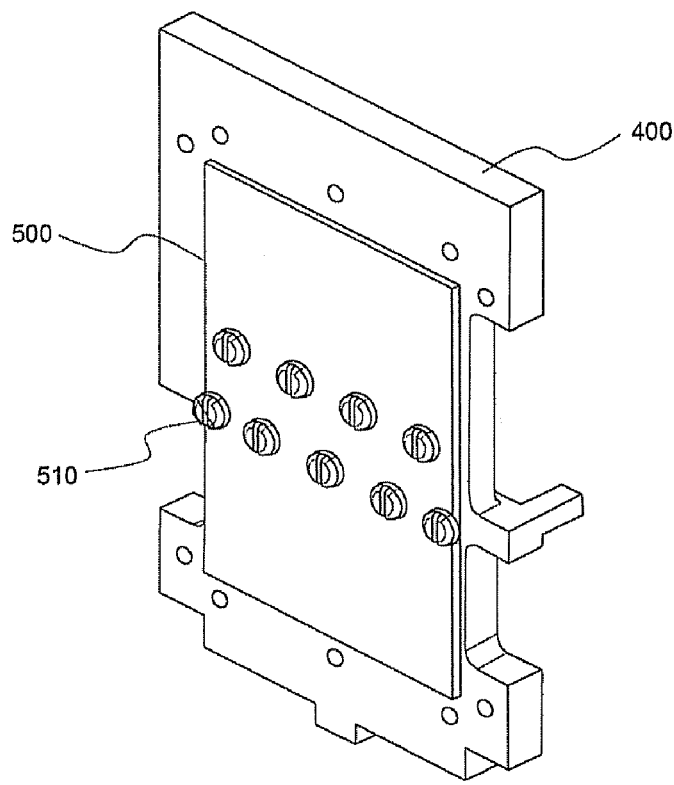
FIG. 7 is a perspective view illustrating a battery management system (BMS) board coupled to the base plate of FIG. 6.

FIG. 7 is a perspective view illustrating a battery management system (BMS) board coupled to the base plate of FIG. 6.

Referring to FIG. 7, the BMS board 500 is a printed circuit board having a circuit (not shown) for monitoring the voltage and the temperature of the unit cells to control the unit cells formed thereon. When the BMS board 500 is brought into contact with the base plate 400, the horizontal bent parts 340 (see FIG. 6) exposed from the front surface (or the outer surface) of the base plate 400 are directly connected with the BMS board 500, whereby the electrical connection between the BMS board 500 and the base plate 400 is accomplished. Preferably, the BMS board 500 is coupled to the base plate 400 by threadedly inserting conductive screws 510 into the coupling grooves 342 (see FIG. 6) formed in the horizontal bent parts of the bus bars through holes (not shown) formed in the BMS board 500. As a result, the mechanical coupling and the electrical connection between the BMS board 500 and the base plate 400 are simultaneously accomplished.

As described above in detail with reference to FIGS. 1 to 7, the assembly can be easily carried out due to the specific structure of the bus bar according to the present invention. Also, the bus bar can be connected to the BMS without using additional connecting members. Furthermore, the mechanical coupling and the electrical connection are excellent in the assembled state. Consequently, the mechanical coupling and the electrical connection are stably maintained even when the external forces, for example, impacts or vibrations, are applied to the assembly.

Figure 8:
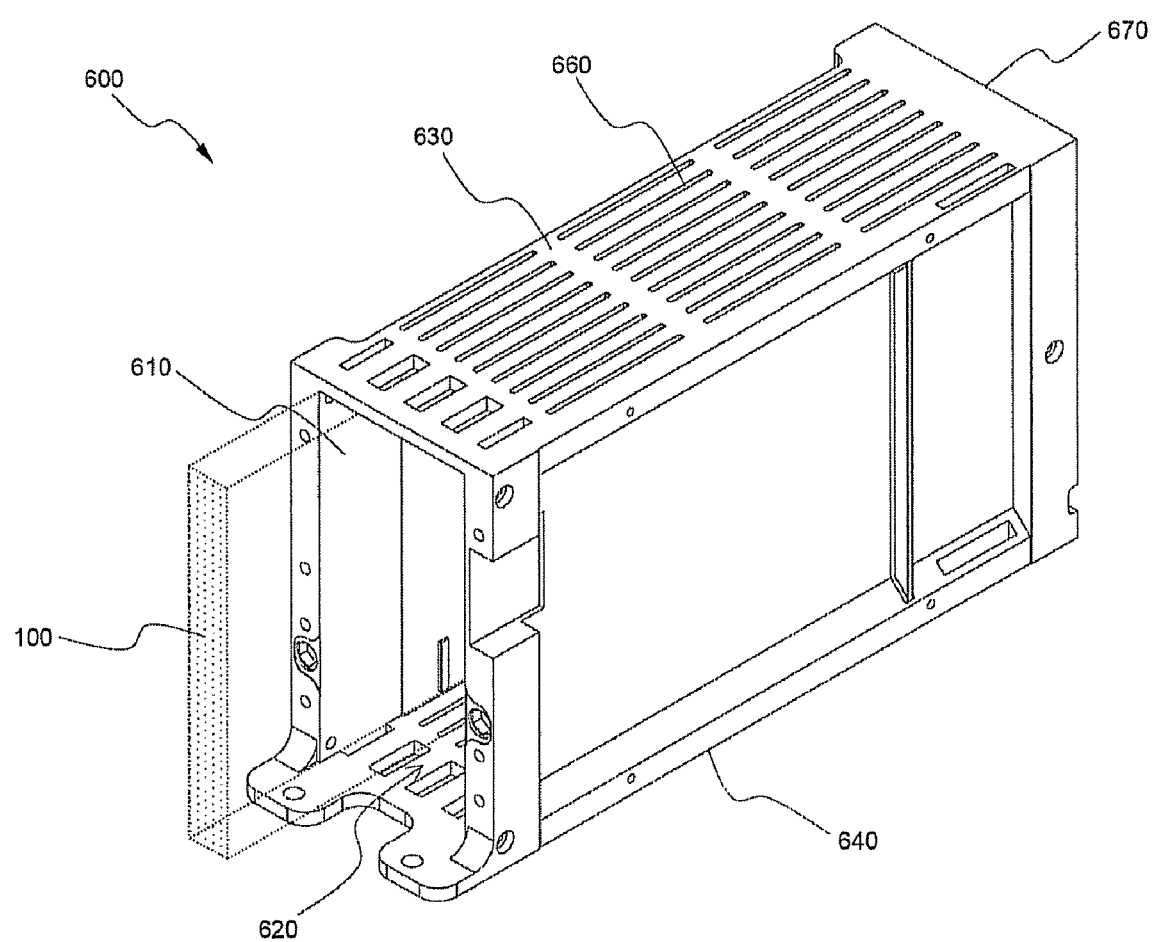
FIG. 8 is a perspective view illustrating a box-shaped module case, which is used to manufacture a battery module according to a preferred embodiment of the present invention.
Figure 9:
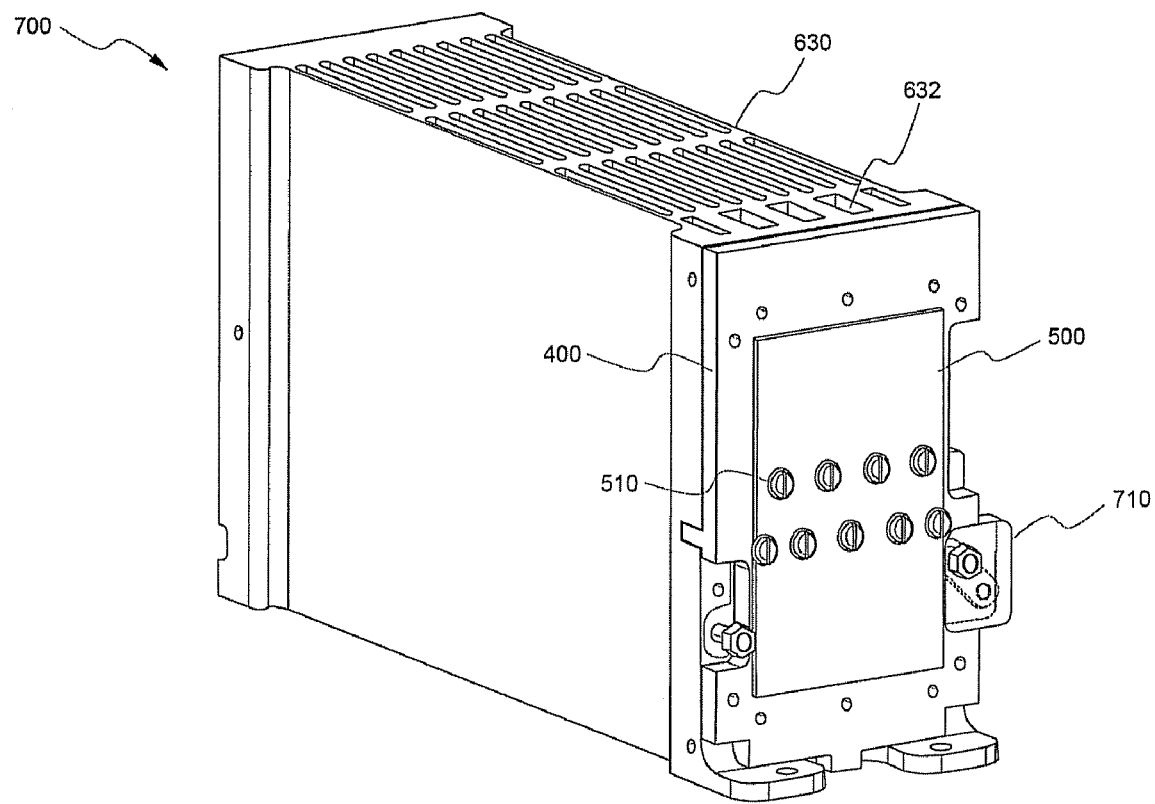
FIG. 9 is a perspective view typically illustrating a battery module according to a preferred embodiment of the present invention.

FIG. 8 is a perspective view typically illustrating a box-shaped module case, which is used to manufacture a battery module according to a preferred embodiment of the present invention, and FIG. 9 is a perspective view typically illustrating a battery module according to a preferred embodiment of the present invention.

Referring to these drawings, the module case 600 has an open front part 610 and an inner space 620, in which a plurality of battery cartridges 100 are mounted. The module case 600 is constructed approximately in the shape of a box. The module case 600 is provided at the upper and lower ends 630 and 640 thereof with pluralities of through-channels 660, which communicate with the inner space 620 of the module case 600. According to circumstances, the through-channels 660 may be further formed at the rear surface 670 of the module case 600.

The base plate 400, to which the bus bars (not shown) are attached, is mounted at the open front part 610 of the module case 600 while a plurality of battery cartridges 100 are mounted in the module case 600, and then the base plate 400 is securely assembled to the module case 600 using bolts and nuts.

After the assembly is completed, welding tips (not shown) are introduced through introduction holes 632 formed at the upper end 630 of the module case 600 to carry out the resistance welding of the bus bars 300 and the electrode terminals. When the resistance welding is carried out, other welding tips (not shown) are connected to the outer surfaces of the bus bars 300 exposed through the openings 410 of the base plate 400. According to circumstances, it is possible to directly carry out laser welding to the bus bars 300 exposed through the openings 410 of the base plate 400. Since the introduction holes 632, through which the welding tips are introduced, communicate with the depression 115 of the battery cartridge 100, which is shown in FIG. 1, the welding tips can be easily connected to the rear surfaces of the electrode terminals through the depressions 115 and the welding grooves 116, as described with reference to FIG. 1.

After that, the BMS board 500 is placed on the front surface (the outer surface) of the base plate 400, and is then fixed to the base plate 400 by means of the screws 510.

According to circumstances, a safety plate (not shown) may be attached to the outer surface of the base plate 400.

The battery module 700 completed through the above-described assembly has a compact structure. Consequently, the battery module 700 provides high output per unit volume. Also, the battery module provides high mechanical and electrical stability against external impacts.

Furthermore, a plurality of battery modules 700 having the above-described construction may be electrically connected with each other to manufacture a high-output, large-capacity battery pack. In this case, the electrical connection between the battery modules 700 is accomplished by a connecting member 710 coupled to one side of the base plate 400. The details of the connecting member 710 are described in Korean Patent Application No. 2005-32500, which has been filed in the name of the applicant of the present application. The description of the above-mentioned patent application is hereby incorporated by reference.

This battery pack is very useful as a power source for electric vehicles, especially, hybrid electric vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, it is not necessary to use additional connecting members for detecting the voltage of unit cells when the bus bar according to the present invention is used in a battery module or a battery pack. Consequently, the battery module or the battery pack can be manufactured in a compact structure. Also, the electrical connection and the mechanical coupling are easily accomplished in spite of the compact structure. Furthermore, the electrical characteristics, such as electrical resistance at connected regions after the electrical connection, and the mechanical strength against external impacts or vibrations are excellent. In addition, it is possible to prevent occurrence of short circuits, which may be caused by a user or an operator, during a manufacturing process of the battery module or the battery pack or during a maintenance process of the battery module or the battery pack.

What is claimed is:

1. A bus bar that simultaneously performs the electrical connection between a plurality of unit cells and the detection of voltage of the unit cells in a battery module having the unit cells mounted therein, wherein the bus bar comprises:
    vertical bent parts formed by bending opposite ends of a strip-shaped bar body in the same direction, respectively, the vertical bent parts being provided with coupling grooves or coupling protrusions; and
    a horizontal bent part formed by bending one of the vertical bent parts toward the bar body such that the horizontal bent part is parallel with the bar body, wherein
    the electrode terminals of the unit cells are connected to the rear surface of the bar body of the bus bar, whereby the electrical connection between the unit cells is accomplished, and
    the horizontal bent part of the bus bar is directly connected to a battery management system (BMS) for monitoring the potential difference and the temperature of the unit cells to control the unit cells.

2. The bus bar according to claim 1, wherein the bus bar is mounted to a base plate such that the bus bar can be connected to electrode terminals of the unit cells, and
    the base plate is a rectangular member including a plurality of openings, in which a plurality of bus bars are mounted, respectively, the openings being provided with coupling protrusions or coupling grooves corresponding to the coupling grooves or the coupling protrusions formed at the vertical bent parts of the bus bars.

3. The bus bar according to claim 1, wherein the BMS is constructed in the form of a printed circuit board (PCB), and the horizontal bent part of the bus bar is provided with a coupling groove or a coupling protrusion, by which the electrical connection and the mechanical coupling between the horizontal bent part and the BMS is accomplished.

4. The bus bar according to claim 3, wherein the horizontal bent part is provided with a coupling groove having a thread formed therein, the BMS board is provided with holes extending through a circuit of the BMS board, and the bus bar and the BMS board are coupled with each other using a conductive screw while the bus bar and the BMS board are arranged such that the coupling groove communicates with one of the holes.

5. A battery module including a plurality of unit cells, wherein the electrical connection between the unit cells and the detection of voltage of the unit cells are simultaneously performed using a bus bar according to claim 1.

6. The battery module according to claim 5, wherein the unit cells are included in the battery module while the unit cells are mounted in battery cartridges constructed in a frame structure.

7. The battery module according to claim 6,
wherein each battery cartridge includes a pair of outer frame members (a, b) and an inner frame member (c) disposed between the outer frame members (a, b), and
wherein one or more unit cells are mounted between the first outer frame member (a) and the inner frame member (c), and one or more unit cells are mounted between the second outer frame member (b) and the inner frame member (c).

8. The battery module according to claim 6, wherein each battery cartridge is provided with a thermistor for measuring the temperature of the unit cells.

9. The battery module according to claim 6, wherein the bus bar is mounted to a base plate such that the bus bar can be connected to electrode terminals of the unit cells, and the base plate is a rectangular member including a plurality of openings, in which a plurality of bus bars are mounted, respectively, the openings being provided with coupling protrusions or coupling grooves corresponding to the coupling grooves or the coupling protrusions formed at the vertical bent parts of the bus bars, and the base plate is attached to the upper end parts of a plurality of stacked battery cartridges.

10. The battery module according to claim 9, wherein a BMS for monitoring the potential difference and the temperature of the unit cells to control the unit cells is mounted to one surface of the base plate (opposite to the surface with which the upper end parts of the battery cartridges are in contact) in a direct contact fashion.

11. The battery module according to claim 6, wherein the battery module comprises:
 a cartridge assembly including two or more battery cartridges; and
 a box-shaped case having an open front part, through which the cartridge assembly is inserted, and an inner space, in which the cartridge assembly is mounted.

12. The battery module according to claim 10, wherein the outer surface of the BMS is covered by a safety plate.

13. A high-output, large-capacity battery pack comprising a plurality of battery modules according to claim 5, the battery modules being electrically connected with each other.

14. A battery module including a plurality of unit cells, wherein the electrical connection between the unit cells and the detection of voltage of the unit cells are simultaneously performed using a bus bar according to claim 2.

15. A battery module including a plurality of unit cells, wherein the electrical connection between the unit cells and the detection of voltage of the unit cells are simultaneously performed using a bus bar according to claim 3.

16. A battery module including a plurality of unit cells, wherein the electrical connection between the unit cells and the detection of voltage of the unit cells are simultaneously performed using a bus bar according to claim 4.

* * * * *